United States Patent
Nolte et al.

(10) Patent No.: US 10,642,014 B2
(45) Date of Patent: May 5, 2020

(54) BIODYNAMIC MICROSCOPES AND METHODS OF USE THEREOF

(71) Applicant: Purdue Research Foundation, West Lafayette, IN (US)

(72) Inventors: David D. Nolte, Lafayette, IN (US); John J. Turek, West Lafayette, IN (US); Ran An, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 293 days.

(21) Appl. No.: 15/068,275

(22) Filed: Mar. 11, 2016

(65) Prior Publication Data
US 2016/0266365 A1  Sep. 15, 2016

Related U.S. Application Data

(60) Provisional application No. 62/132,015, filed on Mar. 12, 2015.

(51) Int. Cl.
*G02B 21/00* (2006.01)
*G02B 21/36* (2006.01)
(Continued)

(52) U.S. Cl.
CPC ....... *G02B 21/0088* (2013.01); *G02B 6/0008* (2013.01); *G02B 6/2804* (2013.01);
(Continued)

(58) Field of Classification Search
None
See application file for complete search history.

(56) References Cited

U.S. PATENT DOCUMENTS 5,245,371 A * 9/1993 Nagano ............... G02B 7/287
                                           348/E5.045
5,301,010 A   4/1994 Jones et al.
(Continued)

FOREIGN PATENT DOCUMENTS

WO    WO 2013/140396 A1    9/2013

OTHER PUBLICATIONS

Izatt, Joseph A., Michael R. Hee, Gabrielle M. Owen, Eric A. Swanson, and James G. Fujimoto. "Optical coherence microscopy in scattering media." Optics letters 19, No. 8 (1994): 590-592. (Year: 1994).*

(Continued)

*Primary Examiner* — Clifford Hilaire
(74) *Attorney, Agent, or Firm* — Bose McKinney & Evans LLP (57) ABSTRACT

An apparatus for viewing a biological sample that functions as both a microscope and an interferometer. A short-coherence light source directs light onto the sample. A Fourier transform lens and a pixel-array detector are positioned to collect light scattered by the sample. An optic fiber assembly conveys a reference beam from the short-coherence light source. The detector collects the reference beam and the signal beam and uses coherence gating to acquire interferometric image data. In some embodiments the axis of the incident light striking the sample and the axis of collected scattered signal light form an angle of less than 180 degrees and advantageously an angle between 120 and 150 degrees. A method of converting a microscope into an interferometer is also disclosed.

37 Claims, 5 Drawing Sheets

(51) Int. Cl.
*G02B 21/08* (2006.01)
*G02B 21/14* (2006.01)
*G02B 21/24* (2006.01)
*G03H 1/00* (2006.01)
*G02F 1/21* (2006.01)
*G03H 1/04* (2006.01)
*G02B 6/28* (2006.01)
*F21V 8/00* (2006.01)

(52) U.S. Cl.
CPC .......... *G02B 21/086* (2013.01); *G02B 21/14* (2013.01); *G02B 21/24* (2013.01); *G02B 21/365* (2013.01); *G03H 1/0443* (2013.01); *G03H 1/0465* (2013.01); *G02F 2001/212* (2013.01); *G03H 2001/005* (2013.01); *G03H 2001/0445* (2013.01); *G03H 2001/0467* (2013.01); *G03H 2222/24* (2013.01)

(56) References Cited

U.S. PATENT DOCUMENTS

| | | | |
|---|---|---|---|
| 5,491,552 A | 2/1996 | Knuttel | |
| 5,768,033 A * | 6/1998 | Brock | G02B 21/0008 359/813 |
| 6,239,905 B1 | 5/2001 | Toyoda et al. | |
| 8,749,883 B2 | 6/2014 | Kitahara | |
| 8,982,456 B2 | 3/2015 | Dietzsch et al. | |
| 2002/0013531 A1* | 1/2002 | Hayashi | A61K 49/0034 600/476 |
| 2003/0010877 A1* | 1/2003 | Landreville | F16M 11/2085 248/149 |
| 2007/0086919 A1 | 4/2007 | Akcakir | |
| 2009/0002789 A1* | 1/2009 | Lauer | G01B 11/2441 359/22 |
| 2009/0125242 A1* | 5/2009 | Choi | G01N 21/45 702/19 |
| 2010/0141954 A1 | 6/2010 | Kobayashi | |
| 2010/0245694 A1* | 9/2010 | Yelleswarapu | G02B 21/14 349/20 |
| 2010/0331672 A1 | 12/2010 | Nolte et al. | |
| 2011/0242537 A1* | 10/2011 | Shigeta | G01N 21/8903 356/430 |
| 2012/0105858 A1 | 5/2012 | Popescu et al. | |
| 2012/0200901 A1 | 8/2012 | Dubois et al. | |
| 2012/0281224 A1 | 11/2012 | Wax et al. | |
| 2013/0088568 A1* | 4/2013 | Nolte | A61B 5/0075 348/40 |
| 2013/0096017 A1 | 4/2013 | Nolte et al. | |
| 2015/0062592 A1 | 3/2015 | Nolte et al. | |
| 2016/0299057 A1* | 10/2016 | Casas | H04N 1/2191 |

OTHER PUBLICATIONS

Michael W. Davidson Olympus BX51 "Fluorescence Microscopy" (WebArchive) (Year: 2014).*
International Search Report and Written Opinion; PCT/US2016/022159; dated Jun. 21, 2016 (11 pages).
Girshovitz et al., "Generalized Cell Morphological Parameters Based on Interferometric Phase Microscopy and Their Application to Cell Life Cycle Characterization," Biomedical Optics Express, Jun. 29, 2012, pp. 1757-1773, vol. 3, issue 8.
Franke et al., "High Resolution Holoscopy," Optical Coherence Tomography and Coherence Domain Optical Methods in Biomedicine XVI, Jan. 30, 2012, 6 pages, vol. 8213.
Hillman et al., "High-Resolution, Wide-Field Object Reconstruction with Synthetic Aperture Fourier Holographic Optical Microscopy," Optics Express, Apr. 28, 2009, pp. 7873-7892, vol. 17.
Haeberle et al., "An Introduction to Diffractive Tomographic Miscroscopy," Modern Research and Educational Topics in Microscopy, 2007, pp. 956-967.
Extended European Search Report, EP 16 76 2662 (PCT/US2016/022159), dated Oct. 10, 2018, 12 pages.

* cited by examiner

BIODYNAMIC MICROSCOPES AND METHODS OF USE THEREOF

CROSS REFERENCE TO RELATED APPLICATIONS

This application claims priority under 35 U.S.C. 119(e) of U.S. provisional patent application Ser. No. 62/132,015 filed on Mar. 12, 2015 entitled BIODYNAMIC MICROSCOPES AND METHODS OF USE THEREOF the disclosure of which is hereby incorporated herein by reference.

GOVERNMENT RIGHTS IN PATENT

This invention was made with government support under EB016582 awarded by the National Institutes of Health and under CBET1263753 awarded by the National Science Foundation. The government has certain rights in the invention.

BACKGROUND

The present invention generally relates to microscopes. More particularly, this invention relates to a microscope with holographic imaging capabilities.

Microscopes have a multitude of applications with medical applications being an area where microscopes find wide use. For example, the microscopic viewing of tumors when treating a patient is quite common but is subject to limitations.

Tumors typically consist of cell types that may be differentially susceptible to therapeutic agents. Often recurrence occurs as a result of resistant cells selected as a consequence of treatment and subsequently proliferating. The ability to observe a fresh tumor and account for therapeutic effects qualitatively through visual observation could greatly enhance the selection of appropriate therapies.

Three dimensional (3D) tissue imaging is currently performed by multi-photon microscopy that require the sample to treated with fluorescent dyes. Accordingly, there is an ongoing desire for improved methods and apparatuses suitable for observing fresh tumors and account for therapeutic effects qualitatively through visual observation. Such methods and apparatuses would also prove useful in other applications.

SUMMARY

The present invention provides an apparatus that combines the attributes of a microscope with those of an interferometer. In this regard, it is noted that the disclosed embodiments employ a microscope in the acquisition of interferometric image data as opposed to short range telescopes thereby allowing for much higher resolution of small features.

The invention comprises, in one form thereof, an apparatus for viewing a biological sample. The apparatus includes a stage on which the sample is positionable. A repositionable objective is operably coupled with a viewport with the objective being positionable whereby the sample can be viewed through the viewport. The apparatus also includes a short-coherence light source wherein the apparatus is configured such that light from the light source is directed onto the sample. A Fourier transform lens and a pixel-array detector are positioned wherein light scattered by the sample forms a signal beam that is directed through the Fourier transform lens onto the pixel-array detector. An optic fiber assembly is disposed to collect light from the short-coherence light source and emit a reference beam that is directed onto the detector wherein the detector collects the reference beam and the signal beam to thereby acquire interferometric image data.

In some embodiments of the apparatus, the emitted signal light is scattered by the sample wherein the emitted signal light defines an emitted light axis, and the scattered signal light defines a scattered light axis that is directed toward an optical assembly including the Fourier transform lens, the emitted light axis and the scattered light axis defining an angle less than 180 degrees. In such an apparatus, the depth within the sample at which the interferometric image data is acquired may be determined by coherence gating. Further, the short-coherence light source may define a bandwidth no greater than 50 nm. Still further, the angle between the emitted light axis and the scattered light axis may be between 120 and 150 degrees.

In some embodiments of the apparatus, the optic fiber assembly includes a first fiber which collects light from the short-coherence light source, a first beam splitter coupled with the first fiber which splits the collected light into a signal portion and a reference portion, the signal portion being emitted and directed at the sample, the scattered light generated thereby forming the signal beam, a second fiber conveying the reference portion to a position where the reference portion is emitted to form the reference beam. The emitted reference beam may advantageously be directed at a pair of mirrors fixed relative to each other and mounted on a moveable platform wherein selective movement of the platform varies the path length of the reference beam to thereby adjust a depth within the sample which will be coherence-gated by collection of the signal beam and reference beam. Such an apparatus may further include a beam combiner wherein the beam combiner is disposed in the signal beam path after the Fourier transform lens and before the detector and wherein the beam combiner is disposed in the reference beam path after the pair of mirrors and before the detector and wherein the beam combiner directs both the signal beam and the reference beam at the detector.

An apparatus as described in the preceding paragraph may also include a microscope assembly having a microscope housing which supports the stage, the repositionable objective and the viewport, the apparatus further including an interferometry assembly that includes an ancillary structure securable to the microscope housing, the ancillary structure supporting the Fourier transform lens, the moveable platform, the pair of mirrors, the beam combiner and the detector.

The apparatus also advantageously includes a spatial filter disposed in the image plane of the signal beam path before the Fourier transform lens.

In some embodiments, the apparatus is configured such that emitted signal light passes through a first polarizing filter, is then reflected by a second beam splitter, the signal light is then scattered by the sample, the scattered signal light passing back through the second beam splitter before being directed through the spatial filter.

In some embodiments, the apparatus defines a signal path from the short-coherence light source to the detector and a reference path from the short-coherence light source to the detector and wherein each of the signal path and the reference path include at least one section defined by a fiber optic cable and at least one section defined by free-space communication and wherein the apparatus includes a microscope assembly having a microscope housing which supports the stage, the repositionable objective, and the viewport; an interferometry assembly that includes an ancillary structure securable to the microscope housing, the ancillary structure supporting the spatial filter, the Fourier transform lens, the moveable platform, the pair of mirrors, the beam combiner and the detector; and the reference path is defined by the first fiber and the second fiber from the short-coherence light source to the position where the reference portion is emitted which is defined by the terminal end of the second fiber, the terminal end of the second fiber being secured to the ancillary structure and wherein the terminal end, the spatial filter, the Fourier transform lens, the pair of mirrors mounted on the moveable platform, the beam combiner and the detector are all mounted relative to the ancillary structure and have predefined spatial relationships with the ancillary structure and each other.

For those embodiments of the apparatus having a optic fiber assembly that includes a first fiber which collects light from the short-coherence light source, a first beam splitter coupled with the first fiber which splits the collected light into a signal portion and a reference portion, the signal portion being emitted and directed at the sample, the scattered light generated thereby forming the signal beam, a second fiber conveying the reference portion to a position where the reference portion is emitted to form the reference beam, the apparatus advantageously defines a signal path from the short-coherence light source to the detector and a reference path from the short-coherence light source to the detector and wherein each of the signal path and the reference path include at least one section defined by a fiber optic cable and at least one section defined by free-space communication and wherein the apparatus includes a microscope assembly having a microscope housing which supports the stage, the repositionable objective, and the viewport; an interferometry assembly that includes an ancillary structure securable to the microscope housing, the ancillary structure supporting the Fourier transform lens and the detector; and the reference path is defined by the first fiber and the second fiber from the short-coherence light source to the position where the reference portion is emitted which is defined by the terminal end of the second fiber, the terminal end of the second fiber being secured to the ancillary structure and wherein the terminal end, the Fourier transform lens, and the detector are all mounted relative to the ancillary structure and have predefined spatial relationships with the ancillary structure and each other. In such an embodiment, the signal emitting terminal end of the optic fiber assembly may be secured to the ancillary structure and emits signal light which is scattered by the sample, the emitted signal light defining an emitted light axis, the scattered signal light defining a scattered light axis and being directed through the spatial filter, the emitted light axis and the scattered light axis defining an angle less than 180 degrees. Advantageously, the angle is between 120 and 150 degrees and, in some embodiments, the angle is 135 degrees.

For those embodiments of the apparatus having a optic fiber assembly that includes a first fiber which collects light from the short-coherence light source, a first beam splitter coupled with the first fiber which splits the collected light into a signal portion and a reference portion, the signal portion being emitted and directed at the sample, the scattered light generated thereby forming the signal beam, a second fiber conveying the reference portion to a position where the reference portion is emitted to form the reference beam, the apparatus may define a signal path from the short-coherence light source to the detector and a reference path from the short-coherence light source to the detector wherein each of the signal path and the reference path include at least one section defined by a fiber optic cable and at least one section defined by free-space communication.

In some embodiments of the apparatus, the Fourier transform lens is slidingly mounted and the apparatus further includes a hot mirror which allows visible light to pass therethrough and reflects infrared light, the hot mirror being positioned such that the infrared light reflected by the hot mirror is deflected to the detector and the visible light allowed to pass through the hot mirror is directed to the viewport whereby the Fourier transform lens can be slid between a first position in which it intercepts the light striking the hot mirror and thereby intercepts the reflected infrared light before it is reflected to the detector and a second position where it does not intercept the light striking the hot mirror and thereby does not intercept the visible light allowed to pass through the hot mirror to the viewport. In such an embodiment, a compensating transparent plate may be mounted between the hot mirror and viewport in the path of the visible light whereby the compensating transparent plate counteracts distortions caused by the hot mirror.

In the various embodiments of the apparatus, the detector may be one of a CCD camera chip, a scientific CMOS chip, and a pixel-array of infrared detectors.

In the various embodiments of the apparatus, the short-coherence light source may define a bandwidth no greater than 50 nm. Advantageously, the short-coherence light source may define a bandwidth between 5 nm and 15 nm. In still other embodiments, the short-coherence light source may define a bandwidth of less than one nm.

In some embodiments of the apparatus, the apparatus includes a diascopic optical train by which light passing through the sample is directed through the objective and to the viewport wherein the sample can be viewed through the diascopic optical train simultaneously with the collection of a signal beam and a reference beam by the detector. In such an embodiment, the viewport may include an eyepiece and the apparatus further includes a near infra-red filter disposed between the objective and the eyepiece. The viewport may alternatively be a camera port.

Some embodiments of the apparatus include an illumination system positioned to illuminate the sample when viewing the sample through the viewport. Such an illumination system may be an episcopic illumination system that directs reflected light through the objective and to the viewport. In such an embodiment, the viewport may include an eyepiece and the apparatus may further include a near infra-red filter disposed between the objective and the eyepiece.

In some embodiments, the apparatus includes a rotatable turret, also known as a nose-piece, the objective being disposed on the rotatable turret. For example, the turret may have a plurality of different objectives mounted thereon wherein each of the objectives may be selectively positioned to view the sample and each of the objectives have different properties, e.g., different level of magnification.

In some embodiments, the apparatus includes a stage having a plurality of wells for holding a plurality of samples, the plurality of wells being repositionable whereby a selected one of the wells is positionable for viewing through the viewport and for collection of data by the detector.

The invention comprises, in yet another embodiment thereof, a method of converting an inverted microscope 40 to an interferometer apparatus 20 wherein the microscope has a microscope housing 38, a stage 22 supported on the microscope housing. A sample is positionable on the stage and an objective 26 and a viewport 30 operably coupled with the objective through which the sample can be observed are also supported on the microscope housing. The method includes providing an interferometry assembly 48, 48a having an ancillary structure 50 wherein a short-coherence light source 52 is operably coupled the ancillary structure 50, a first fiber optic cable 56 collects light from the short-coherence light source and is coupled with a first beam splitter 58 which splits the collected light into a signal portion and a reference portion, the signal portion being emitted by a signal emitting terminal end 59 that is fixed to the ancillary structure 50 and the reference portion being conveyed by a second fiber optic cable 60 to a position where a reference emitting terminal end 74 of the second fiber optic cable is fixed to the ancillary structure 50 and the reference portion is emitted to form a reference beam, the interferometry assembly further including a pair of mirrors 76 fixed relative to each other and mounted on a movable platform 78, the reference beam being directed at the pair of mirrors and the platform being selectively moveable relative to the ancillary structure whereby selective movement of the pair of mirrors adjusts the path length of the reference beam from the light source to a pixel-array detector 62; the pixel-array detector being secured to the ancillary structure; the interferometry assembly also including a Fourier transform lens 66, 66a fixed to the ancillary structure. The method also includes securely attaching the interferometry assembly 48, 48a to the microscope housing 38 whereby the emitted signal portion is directed at the sample which scatters the emitted signal light, the emitted light defining an emitted light axis 63a, the scattered signal light defining a scattered light axis 63b and wherein the scattered light forming a signal beam is directed to the Fourier transform lens and then to the detector which is positioned in the Fourier plane of the Fourier transform lens.

In some embodiments of the method, the emitted light axis and the scattered light axis define an angle less than 180 degrees. Advantageously, the angle between the emitted light axis and the scattered light axis is between 120 and 150 degrees. Coherence gating may be used to control the depth within the sample at which the interferometric image data is acquired. Further, the short-coherence light source may define a bandwidth no greater than 50 nm.

In some embodiments of the method, the Fourier transform lens 66a is slidingly mounted on the ancillary structure 50 and wherein the ancillary structure further includes a hot mirror 92 which allows visible light to pass therethrough and reflects infrared light, the ancillary structure being positioned such that the infrared light reflected by the hot mirror is deflected to the detector and the visible light allowed to pass through the hot mirror is directed to a viewport on the inverted microscope whereby the Fourier transform lens can be slid between a first position in which it intercepts the light striking the hot mirror and thereby intercepts the reflected infrared light before it is reflected to the detector and a second position where it does not intercept the light striking the hot mirror and thereby does not intercept the visible light allowed to pass through the hot mirror to the viewport. Such a method may also include mounting a compensating transparent plate between the hot mirror and viewport in the path of the visible light whereby the compensating transparent plate counteracts distortions caused by the hot mirror.

The invention comprises, in another form thereof, a method of using an apparatus for viewing a biological sample that includes positioning the sample on a stage; positioning an objective to thereby view the sample through a viewport of the apparatus; directing light from a short-coherence light source onto the sample; forming a signal beam with light scattered by the sample and directing the signal beam through a fourier transform lens onto a pixel array detector; using an optic fiber assembly to collect light from the short-coherence light source to emit a reference beam directed onto the detector; and collecting the reference beam and signal beam with the detector and thereby acquiring interferometric image data.

In some embodiments, the method of viewing a biological sample involves the light directed onto the sample defining an emitted light axis and the light scattered by the sample and forming the signal beam defining a scattered light axis wherein the angle between the emitted light axis and the scattered light axis is between 120 and 150 degrees. In such a method, coherence gating may used to control the depth within the sample at which the interferometric image data is acquired. Additionally, the short-coherence light source may define a bandwidth no greater than 50 nm.

All of the above-described embodiments, and those discussed in detail below, are capable of acquiring interferometric image data at resolutions wherein resolvable features are less than 15 microns. This level of resolution is obtained while obtaining interferometric image data wherein each speckle has three fringes and there are at least three pixels (on the pixel-array detector) for each fringe.

The different embodiments described herein may be positioned on an anti-vibration table to facilitate the acquisition of stable images.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

The present application discloses a microscope that uses a new imaging technique called biodynamic imaging, which uses the physics of partial coherence combined with the propagation of light through biological tissues to measure intracellular motions in living tissue in vitro. This biodynamic microscope may include an illumination unit, a holographic camera unit, and a interferometric unit, as well as other components conventionally included in an inverted microscope.

Alternatively, biodynamic imaging can be implemented on a conventional inverted microscope as an add-on accessory. In such an application, the biodynamic add-on accessory may include the illumination unit, the holographic camera unit, and the interferometric unit. In both applications, the hardware is preferably complemented by a suite of software drivers and analysis programs suitable for enabling biodynamic imaging. Such a microscope assembly provides the means for measuring intracellular motions in living tissue in vitro. In some embodiments, this includes a short-coherence light source to direct light to the sample; a pixel-array detector operably coupled with a reference fiber; and a digital holography unit configured to combine light scattered from the biological sample with light from the reference fiber wherein the apparatus provides the ability to observe internal dynamics of cells in living tissue.

The biodynamic microscope or add-on accessory provides for low-coherence, infrared, digital holographic imaging that performs label-free, non-invasive measurements of intracellular dynamics inside fresh 3D cancer biopsies. By measuring dynamic cellular activity, biodynamic imaging can assess the efficacy of drugs in cancer biopsies or cell samples and pinpoint the most effective treatment regimes. For example, the hardware and software can be used to test first-line therapy across heterogeneous tumors and to select the best possible combination therapies for a patient in second-line therapy all within, preferably, 24 hours. Biodynamic imaging can also select the most viable embryos for in vitro fertilization (IVF), improving pregnancy rates, and decreasing unwanted risks and side effects. On a large scale, it is foreseeable that this process may be used to search for new drug types.

In view of the above, it can be seen that a significant advantage of this invention is that a biodynamic capable microscope provides the ability to use dynamic motions inside 3D living tissue as the imaging contrast with improved spatial resolution over prior biodynamic art. This may be used to assess drug efficacy and pinpoint the most effective treatment regimes, and used for IVF. In addition, add-on accessories may provide biodynamic imaging capabilities to existing microscopes and thereby minimize costs.

This disclosure also teaches how biodynamic imaging can be implemented on a conventional inverted microscope as an add-on accessory. Such an add-on accessory includes two main components: 1) a short-coherence light source that is introduced to the microscope using a fiber splitter; and 2) a digital holography system (also referred to herein as an interferometry assembly) for combining the light scattered from the biological sample with the light from the reference fiber on a pixel-array detector. The hardware may complemented by a suite of software drivers and analysis programs for deriving information from the interferometric data acquired from the pixel-array detector.

Motion is a defining characteristic of living matter. Complex intracellular motions occur in all living tissues and reflect the multitude of functions carried out by cellular biochemistry and biophysics. The apparatus describe herein captures the internal dynamics of cells in living tissue by integrating biodynamic imaging with conventional phase-contrast microscopy. Because of the ubiquity of motion in all living systems, the disclosed apparatus is a general and powerful new tool that can be applied to a wide range of biological applications.

As one example, tumor heterogeneity and differential drug response are among the primary obstacles to the overall survival (OS) of cancer patients. An answer to overcome this obstacle is found in dense three-dimensional tissues and avascular tumors that cannot be tested in conventional two-dimensional cell plates. In some embodiments, the apparatus disclosed herein solves this problem by performing 3D assays to test patient-specific heterogeneous response of tumors to anti-cancer drugs.

In 2010, the National Comprehensive Cancer Network (NCCN) updated the NCCN Clinical Practice Guidelines for Oncology to include the use of chemosensitivity-resistance assays (CSRAs) for decisions related to future chemotherapy in situations where there are multiple chemotherapy options available. The guidelines were updated based on studies published in the International Journal of Gynecologic Cancer that evaluated the association between prediction of response to chemotherapy and progression-free interval and OS in ovarian cancer. The Ovarian Cancer National Alliance stated that oncologists are recognizing the benefits of using chemosensitivity and resistance assays when faced with equivalent therapeutic options. However, an obstacle to wide adoption of CSRAs has been the reliance of these assays on nonviable tumor culture, and especially 2D derived cell culture that have lost their natural three-dimensional tumor heterogeneity. These conventional CSRAs fail to predict heterogeneous drug response and multicellular drug resistance. To fill this gap, embodiments of the apparatus disclosed herein allows the study of drug responsivity in 3D biopsies and thereby may facilitate the promise of the NCCN to provide patients with chemotherapy personalized to their specific cancer phenotype.

As another example of the potential application of the apparatus disclosed herein, high-content screening in drug discovery is based on high-resolution image-based microscopy of monolayer cell culture. However, cells on two-dimensional plates have the wrong shape and the wrong cellular contacts and hence have the wrong microenvironmental context. Cells thrive in three-dimensional environments and communicate with near and distant neighbors. Cells in 2D do not behave as cells do in 3D tissues, with different genetic expression profiles, different intercellular signaling, and different forces attaching them to their environment. Because of this, drugs that have good efficacy in 3D biological contexts may be rejected at this early screening stage when the screening process relies on 2D analysis. This is called false negative selection and represents missed financial opportunities for drug companies and missed therapeutic opportunities for patients.

Therefore, understanding relevant biological functions requires the capture of dynamical processes and motions in three dimensions. The primary barrier to progress has been the lack of a 3D biologically relevant assay that is able to extract high-content information from inside tissue far from surfaces. The apparatus disclosed herein provides the required depth capability, sensitivity to cellular motions, and captures the signatures of different dynamical cellular functions.

The apparatus disclosed herein has the potential to be used in the lead de-risking stage of the drug discovery pipeline. Lead de-risking is the final step of lead selection which seeks to lower the risk of lead failures as they move into pre-clinical trials. One of the key approaches being incorporated into lead de-risking is the use of biologically relevant samples, such as three-dimensional culture. The apparatus disclosed herein can penetrate up to 1 mm in tissue to extract the high information content required for screening and thereby provides a highly valuable tool in the lead de-risking stage.

The apparatus 20 disclosed herein may include an add-on accessory integrated with a conventional inverted microscope. There are many inverted microscope designs and manufacturers. The embodiments depicted in FIGS. 1A, 2A and 3A use the Zeiss AxioObserver, but the invention is not limited to this brand or to this specific microscope design.

Figure 1A:
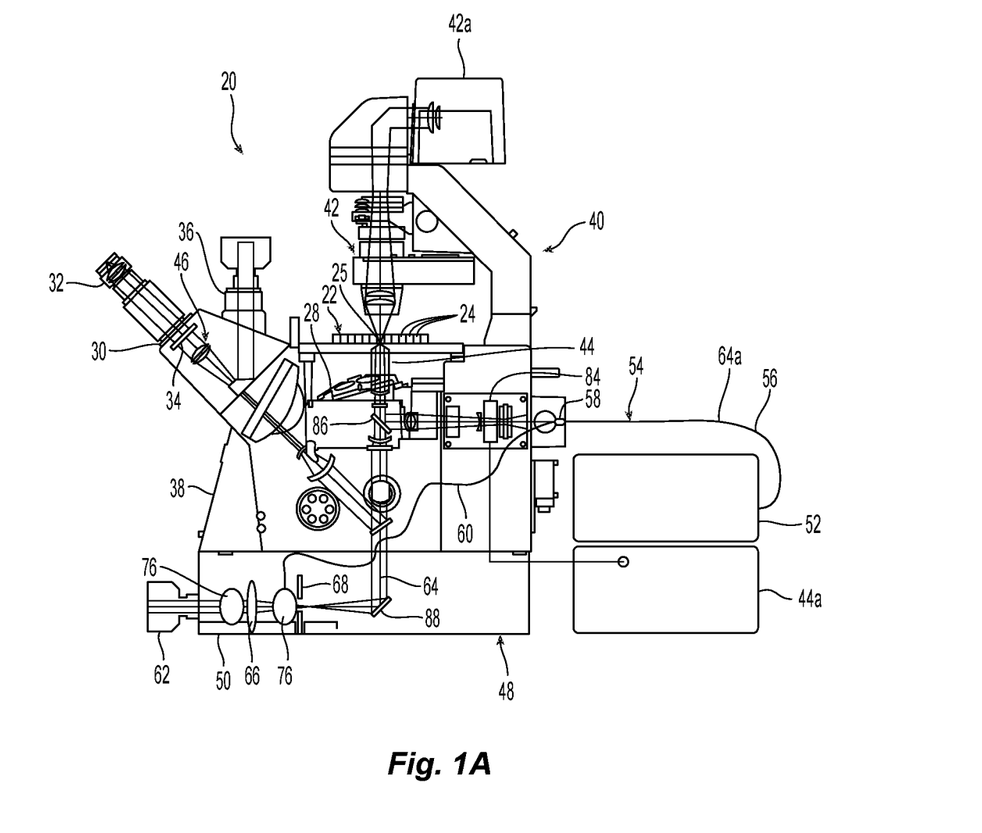
FIG. 1A is a schematic side view of an apparatus for viewing a biological sample.
Figure 1B:
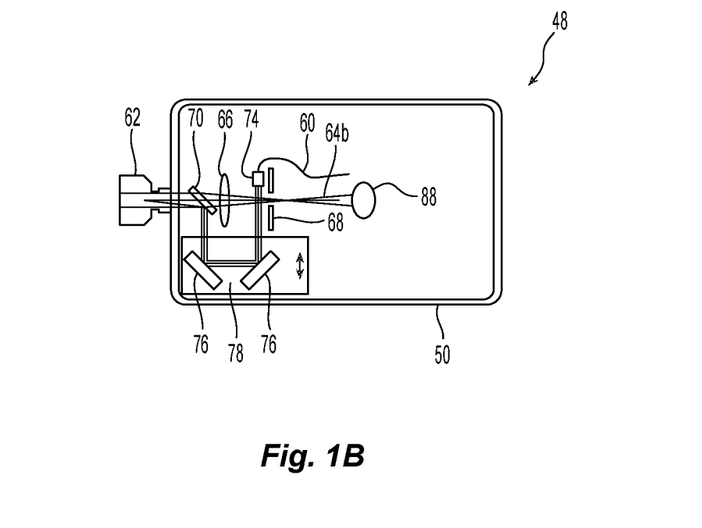
FIG. 1B is a schematic top view of the interferometry assembly of the apparatus of FIG. 1A.
Figure 2A:
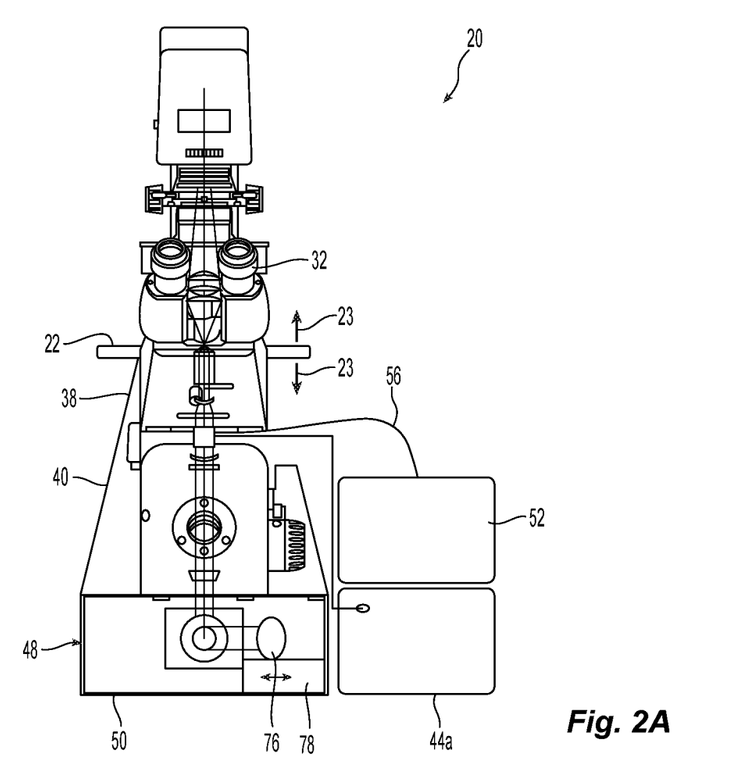
FIG. 2A is schematic front view of the apparatus.
Figure 3A:
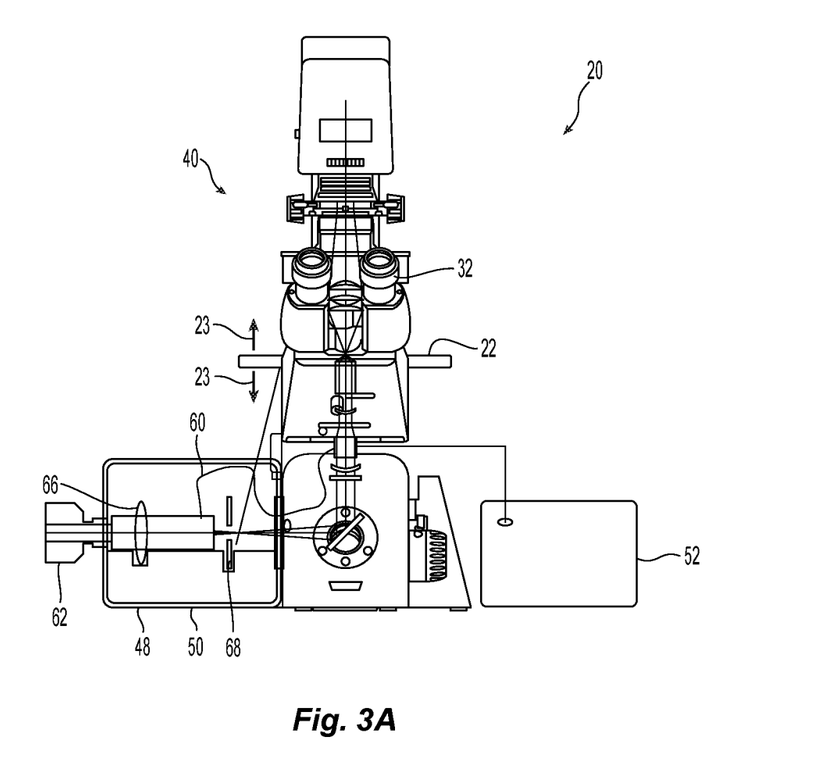
FIG. 3A is a schematic front view of an apparatus for viewing a biological sample.

The embodiments of FIGS. 1A, 2A and 3A provide for the retention of the original phase-contrast and conventional transmission microscopy capabilities allowing simultaneous acquisition of such images with acquisition of interferometric data. The illustrated embodiments also allow the retention of epi-fluorescence capabilities in parallel with the acquisition of interferometric data. The conventional phase-contrast or transmission images are acquired on standard visible light CCD cameras on one of several standard camera ports of the microscope. Simultaneous visible and interferometric images can be merged in a software module.

One embodiment that integrates interferometric data acquisition with a conventional inverted microscope is shown in FIG. 1A. The biodynamic imaging system can be made by attaching two main components to a conventional microscope: 1) a short-coherence light source that is introduced to the microscope using a fiber splitter; and 2) a digital holography system for combining the light scattered from the biological sample with the light from a reference fiber on a pixel-array detector.

The epi-illumination ports on the microscope introduce low-coherence light from a Superlum SLD light-source. The term epi-illumination refers to episcopic illumination which involves viewing light reflected off of the sample as opposed to diascopic illumination which involves viewing light that passes through the sample. The properties of the sample will generally determine which type of illumination is most suitable for viewing the sample. Many conventional microscopes are capable of viewing samples using either type of illumination.

The Superlum SLD light source 52 shown in FIG. 1A is a 20 mW source with a center wavelength in the NIR at 840 nm and a 50 nm bandwidth. The light is delivered from the light source through a fiber that is coupled to a 99:1 fiber splitter 58. The high-intensity arm is launched into the epi-illumination path to illuminate the sample through the objective lens. The low-intensity fiber arm 60 is delivered to the digital holography unit. The low-intensity reference fiber 60 is threaded through the inside of the microscope housing, leaving no visible external view of it. The fiber is advantageously mechanically secured to the inside of the housing to reduce or eliminate fiber movement and vibrations. This mechanical stability is advantageous for stable biodynamic imaging.

The interferometry assembly 48 acts as a Mach Zender interferometer (an interferometer that determines the relative phase shift variations between two collimated beams derived by splitting light from a single source), a picosecond delay line, and a Fourier optical lens 66. The reference fiber 60 enters the interferometry assembly 48 from inside the microscope body. The reference light is coupled out of the fiber through a lens collimator that illuminates the first lens of the picosecond delay line. The two mirrors 76 on the picosecond delay line are on a linear translation stage 78 that adjusts the positions of the mirrors. By adjusting the location of the mirrors 76 across several millimeters, a delay of several picoseconds is achieved. The image enters the interferometry assembly 48 from one of the optical ports 30 of the microscope base. In the embodiment shown in FIG. 1A, the port is the bottom port. The image is directed to an image plane (IP) that is occupied by a spatial filter 68. The image plane is Fourier transformed to the Fourier plane (FP) that is occupied by the pixel array detector 62. In this embodiment, the pixel array detector is a CCD chip. The reference wave is combined with the signal wave at the pixel-array detector 62 with an off-axis configuration through the beam combiner 70. The angle between the signal arm and the reference arm is in the range of several degrees, and produces interference fringes (holographic fringes) on the detector 62 that are in the range of several tens of microns. The output coupling lens is configured so that the spatial overlap on the CCD chip of detector 62 between the signal wave and the reference wave generally exposes the full size of the CCD chip.

Simultaneous with the acquisition of the interferometric data, the conventional phase-contrast and transmission microscopy paths are unobstructed and allow the formation of images at the standard visible viewports 30 which include both camera ports 36 and a eyepiece 32 ports (except for the viewport 30 at which the interferometry assembly 48 is installed). This allows for simultaneous acquisition of visible light images and for manual inspection by the binocular viewport 32. A near infrared notch filter 34 is installed permanently in the binocular mount for laser safety.

To achieve simultaneous acquisition of fluorescence with the interferometric biodynamic image, a UV light source is directed to the filter train of the epi-illumination pathway. The filter train is designed to allow introduction of spatial filters on conjugate planes in the illumination path. For the biodynamic microscope, one of these filter slots will be used to couple the UV light into the illumination path. The UV light travels with the NIR light path through the objective lens to the sample. The emitted fluorescent light is a different wavelength than the NIR light used for biodynamic imaging. The fluorescent light is deflected by a dichroic beamsplitter 86 to one of the camera ports not used for the visible or for the interferometric assembly 48. A CCD camera on the fluorescent port can be co-registered with the interferometric image data and the conventional visible image using an appropriate software package.

In FIGS. 1A, 1B, 2A, 2B, the overall integration of the interferometric assembly and modules onto a conventional inverted microscope is shown. The signal and reference arms of the fiber optic assembly are attached to the base of the objective turret, and the digital holography unit attaches by standard camera mount to the front camera port.

Figure 2B:
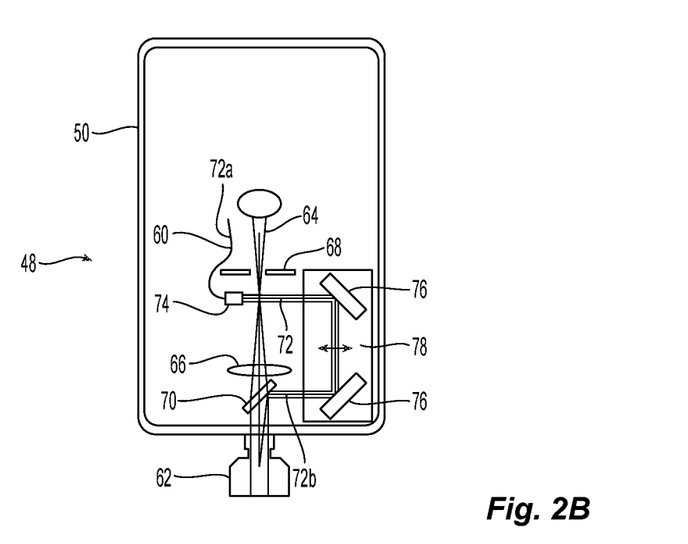
FIG. 2B is a schematic top view of the interferometry assembly.

More details of the optical train are shown in FIGS. 2A, 2B. A variable neutral-density filter is integrated into the reference side to balance the signal and reference intensities at the digital camera 62 for high-contrast digital holography.

The reference arm has a delay line to select the coherence-gate depth and a lens to match the convergence angle of the objective lens. A spatial/angular offset between the signal and reference produce an off-axis hologram on the CCD camera 62 attached to the front camera port.

One beneficial aspect of the embodiments of FIGS. 1A, 1B, 2A, 2B, 3A and 3B is the retention of conventional fluorescence (and transillumination) microscopy capabilities during simultaneous acquisition of interferometric image data. The short coherence enables coherence-gated volumetric imaging of 3D samples. The signal arm port will be the conventional epi-illumination port, while the reference arm will be supported by an internal fiber optic. The reference will have an appropriate path delay for low-coherence gated z-scanning. The digital holography detection unit 48 is attached to the vibration-isolation breadboard that also supports the microscope base that is rigidly fixed to the plate by removing the existing feet and using reversible adhesive. The holography is the coherence gate for the interferometric system. Simultaneous with the interferometric data acquisition, the conventional fluorescence (and optional transmission) microscopy paths are unobstructed and will allow the formation of images at the standard visible CCD camera or for manual inspection by the binocular viewport. Note that an NIR short-pass filter is installed permanently in the binocular mount for laser safety. Simultaneous fluorescent and interferometric images can be merged in a software module.

There are numerous pixel-array detectors 62 that can be used to record the raw hologram. These pixel-array detectors can be a CCD camera chip, a scientific CMOS chip, a pixel-array of infrared detectors (IR camera chip) or other suitable detector.

There are also numerous ways of attaching the digital holography unit 48 to an inverted microscope. There are several options for extracting images from the microscope: left camera port, right camera port, front camera port, binocular port and bottom port. FIGS. 1A, 1B, 2A, 2B illustrate an embodiment where the interferometric assembly 48 is disposed under the base of the inverted microscope. A side-port configuration is shown in FIGS. 3A, 3B.

Figure 3B:
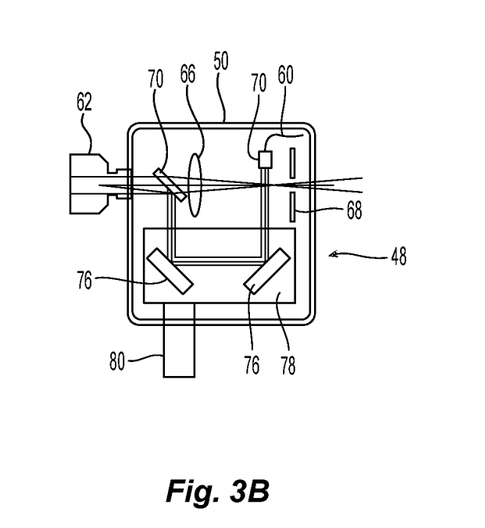
FIG. 3B is a schematic top view of the interferometry assembly of the apparatus of FIG. 3A.
Figure 4:
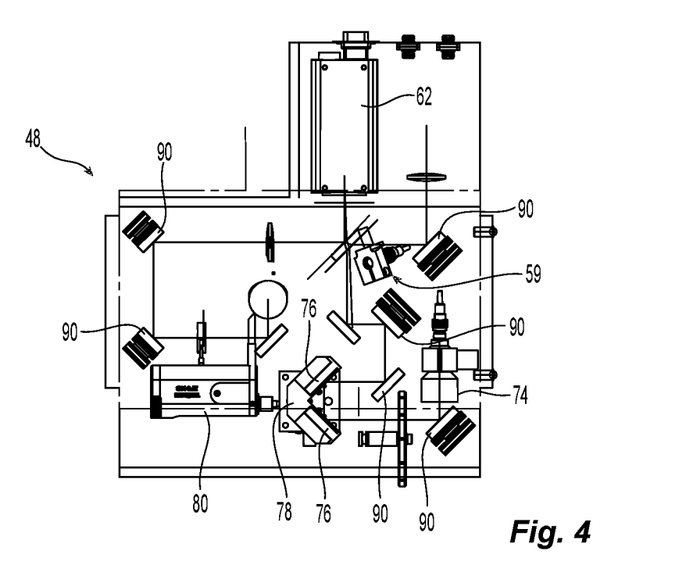
FIG. 4 is a view of an alternative interferometry assembly.
Figure 5:
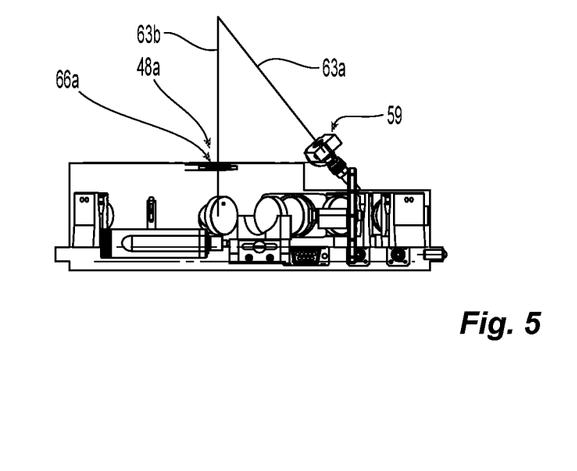
FIG. 5 is another view of the interferometry assembly of FIG. 4.
Figure 6:
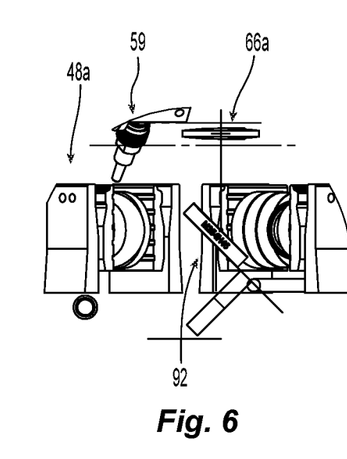
FIG. 6 is another view of the interferometry assembly of FIG. 4.
Figure 7:
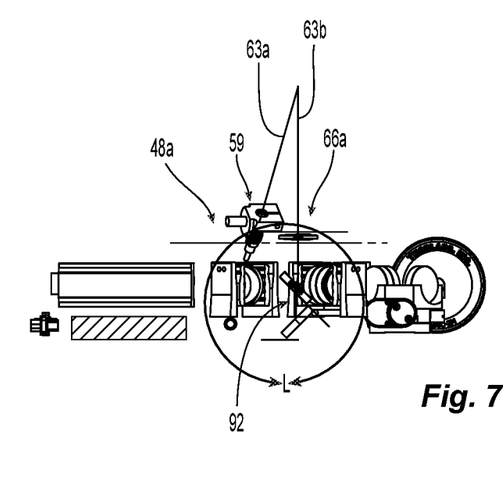
FIG. 7 is another view of the interferometry assembly of FIG. 4.

In the side-port configuration of FIGS. 3A, 3B, the image plane of the standard camera configuration is occupied by a spatial filter. The image plane is transformed to the Fourier plane at the pixel-array chip. The deflecting mirror 88 can deflect the image out the left, right or front camera mount.

The illustrated configuration allows for simultaneous acquisition of fluorescence and interferometric image data. Delivering the UV light to the illumination path can be performed using a conventional microscope filter train that is generally accessible for user manipulation. One of the filter slots will be converted to a dichroic beamsplitter that transmits the near infrared (NIR) light from the infrared source, and that reflects the UV light into the illumination path. The efficiency of this dichroic can approach 100% for transmitting IR and reflecting UV. An alternative embodiment would use a fiber coupler that integrates the UV and NIR into the same fiber. This would open up the filter slots for user access.

Digital holography requires high mechanical stability for stable holography. Various features are disclosed herein that enhance mechanical stability and can be used in isolation or various combinations. These features for reducing mechanical motions include, but are not limited to: 1) placing the interferometric assembly on a vibration-absorbing breadboard; 2) immobilizing the reference fiber relative to the microscope housing; 3) placing the breadboard on vibration-isolation mounts (feet or table). Generally, the most stable position for the interferometric assembly will be underneath the microscope housing because this provides the most stable attachment of the assembly to the microscope. The other embodiments (for example, FIGS. 3A, 3B) would be less mechanically stable, but if needed, such a side-mount configuration can be stabilized by creating a solid mechanical attachment to the side of the microscope. Alternatively, the interferometric unit can be located beneath the nose piece for highly stable mechanical integration of the interferometric unit into the microscope.

Turning now to FIGS. 1A-3B, an apparatus 20 for viewing a biological sample is illustrated. Apparatus 20 includes a microscope assembly 40 in the form of an inverted microscope which includes a microscope housing 38 that supports a stage 28, at least one repositionable objective 26 and at least one viewport 30. Generally, more than one viewport 30 will be provided and may take the form of either an eyepiece 32 through which the sample may be directly visually inspected or a camera port 36 which allows for the attachment of a conventional camera 37 and the acquisition of images of the sample.

Stage 22 supports a sample 25 such as a biological sample. In some embodiments, stage 22 can be vertically moved as indicated by arrows 23 to alter the relative position of the sample 25 being viewed. The stage 22 depicted in FIG. 1A includes a plurality of wells 24 wherein each of the wells 24 can hold a separate sample 25. The wells 24 are repositionable so that a selected one of the wells can be moved into position for viewing or for taking interferometric images.

A rotatable turret (nose piece) 28 has a plurality of repositionable objectives 26 mounted thereon so that an appropriate objective 26 can be selected for viewing the sample. The objective 26 is operably coupled with a viewport 30 to provide for viewing of the sample or the acquisition of an image using a camera or other device. As mentioned above, viewport 30 may take various forms and apparatus 20 may include a plurality of viewports 30. One example of a viewport is binocular eyepiece 32. A near infra-red short pass filter 34 is disposed in the optic train between objective 26 and eyepiece 32 to provide for eye safety. Alternative viewports include camera ports 36.

Apparatus 20 includes a diascopic optical train 42 by which light passes through the sample and is directed through the objective 26 and to one or more viewports 30. In the embodiments of FIGS. 1A-3B, the sample can be viewed through the diascopic optical train 42 simultaneously with the collection of a signal beam and a reference beam by detector 62 for the acquisition of interferometric image data. Apparatus 20 includes a diascopic illuminator system 42A.

Apparatus 20 also includes an episcopic optical train 44 with an episcopic illumination system 44A that directs light on the sample such that light is reflected through the objective 26 and to one or more viewports 30. Many of the optical components 46 of apparatus 22 are common to both the diascopic and episcopic optical trains 42, 44 with the primary distinction being the illumination systems and location thereof.

Apparatus 20 also includes an interferomety assembly 48 with an ancillary structure 50 on which several optical components are mounted and a short-coherence light source 52. Apparatus 20 is configured so that light from source 52 is directed onto the sample and backscattered light is collected. An optic fiber assembly 54 includes first optic fiber 56 which collects light from source 52. A first beam splitter 58 is coupled with first fiber 56 and splits the collected light into a signal portion and a reference portion. A signal emitting terminal end 59 is disposed following beam splitter 58 emits signal light that is directed at the sample. The emitted signal light is scattered by the sample and a collected portion of the scattered light forms a signal beam that is ultimately directed to detector 62.

The signal path 64 extends from short-coherence light source 52 to detector 62 and is a hybrid path including at least one section 64a defined by a fiber optic cable, i.e., first fiber optic cable 56, and at least one section 64b defined by free-space communication, e.g., the free-space between the optical components in that section of signal path 64 between beam splitter 58 and detector 62. A mirror 88 deflects the scattered signal light to spatial filter 68 which is located in the image plane. The signal beam is then directed to a Fourier transform lens 66 which in turn directs the signal beam onto detector 62 which is located in Fourier plane of lens 66. A beam combiner 70 is also disposed in signal path 64 between Fourier transform lens 66 and detector 62.

A second fiber 60 conveys the reference portion of the collected light to a position where the reference portion is emitted to form the reference beam. A pixel-array detector 62 collects both the signal beam and the reference beam and thereby acquires interferometric image data.

Reference path 72 extends from short-coherence light source 52 to detector 62 and is also a hybrid path with at least one section 72a of path 72 defined by a fiber optic cable, i.e., fiber optic cable 56 and fiber optic cable 60, and at least one section 72b defined by free space communication, i.e., that section between fiber optic cable 60 and detector 62. Terminal end 74 of second fiber 60 is secured to ancillary structure 50 and emits reference light. The reference beam is directed at a pair of mirrors 76 mounted on a moveable platform 78. A servo motor 80 is used to move platform 78 and mirrors 76 mounted thereon. Selective movement of platform 78 varies the path length of reference path 72 to thereby select the coherence-gate depth within sample 25 of the signal beam. Platform 78 is mounted on tracks that limit and control the sliding movement of platform 78 relative to ancillary structure 50.

Beam combiner 70 is disposed in both the signal path 64 and the reference path 72. Beam combiner 70 is disposed in signal path 64 between Fourier transform lens 66 and detector 62 and is disposed in reference path 72 after the pair of mirrors 76 and before the detector 62. Beam combiner 70 directs both the reference beam and the signal beam to the detector 62 at a critical or cross angle which is further discussed below.

The embodiments of FIGS. 1A-3B disclose embodiments wherein the short coherence light is introduced in a pathway similar to that used for introducing episcopic light in a conventional inverted microscope. In the embodiment of FIGS. 1A-3B, this pathway involves emitting signal light after beam splitter 58. The emitted signal light then passes through a first polarizing filter 84. It is then reflected by a beam splitter 86 that also functions as a polarizing filter. It then strikes the sample and is scattered, some of the scattered signal light then returns and passes through the beam splitter 86 after which it is directed by a mirror 88 to spatial filter 68. It then passes through Fourier transform lens 66 and beam combiner 70 to pixel-array detector 62.

An alternative arrangement is shown in FIGS. 4-7 which uses an interferometry assembly 48a secured to a microscope. This arrangement allows polarizing filter 84 and beam splitter 86 to be omitted. Signal light is emitted following the first beam splitter 58 from a signal emitting terminal end 59 and strikes the sample, some of the scattered light is then directed through a Fourier transform lens 66a and ultimately to the detector 62. This arrangement also repositions the Fourier transform lens 66a and utilizes a different arrangement of reflective mirrors 90 to control the signal path and reference path.

The embodiment of FIGS. 4-7 has a light source 52 wherein a signal emitting terminal end 59 is secured to ancillary structure 50 and is disposed following beam splitter 58. Signal emitting end 59 emits a signal light that is scattered by the sample, the emitted signal light defines an emitted light axis 63a and the scattered signal light that is collected defines a scattered light axis 63b.

Figure 8:
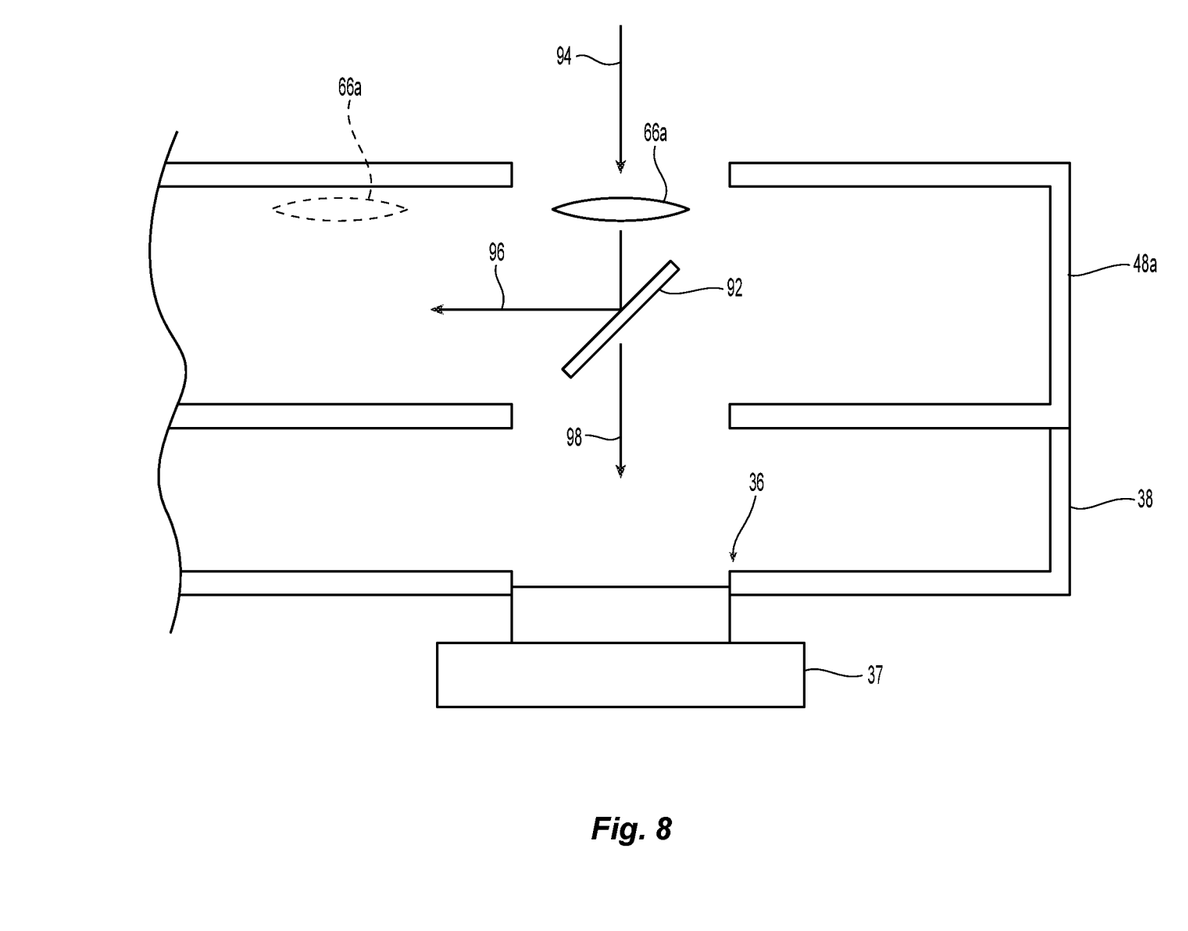
FIG. 8 is a schematic view depicting a sliding Fourier transform lens and hot mirror.

The emitted light axis 63a and scattered light axis 63b define an angle less than 180 degrees in the embodiment of FIGS. 4-7. As further discussed below, this medium angle arrangement allows for a more compact apparatus and reduces stray reflections. In the illustrated embodiment, the angle is 135 degrees however, some variation of this angle can still produce beneficial results, for example angles between 120 and 150 degrees will also generally provide an advantageous balance between light intensity and signal-to-noise ratio. The embodiment of FIGS. 4-7 also utilizes a hot mirror 92 in the signal path. A hot mirror is a device that reflects infrared light while allowing visible light to pass through. As depicted in FIG. 8, incoming light 94 includes both infrared and visible light. Infrared light 96 is reflected by hot mirror 92 and is directed along the signal path toward detector 62. Visible light 98 passes through hot mirror 92 and is directed toward a viewport, e.g., a camera port having a conventional camera 37 mounted thereon for recording images in the visible light spectrum. There is a transparent glass plate that has an identical thickness and complementary angle to the hot mirror. This compensating transparent glass plate ensures that the conventional imaging capabilities of the microscope can be used without image distortion. This arrangement allows the apparatus to be easily switched from an interferometer mode using Fourier transform lens 66a and detector 62 to record interferometric images to a conventional microscope mode to record visible images of the sample simply by sliding Fourier transform lens 66a so that it intercepts the incoming light (interferometric mode) or is positioned to allow the incoming light to strike hot mirror 92 without passing through lens 66a (conventional microscope mode).

In the position indicated in solid lines in FIG. 8, the Fourier transform lens 66a will intercept the incoming light 94 and the reflected infrared light 96 will be recorded by detector 62 and the apparatus will function as an interferometer. Sliding lens 66a to the position indicated by dashed lines in FIG. 8 will allow the incoming light 94 to strike the hot mirror 92 without having passed through Fourier transform lens 66a. The hot mirror 92 will allow visible light 98 to pass through hot mirror 92 and proceed to a viewport. In the illustrated embodiment, the viewport is a camera port 36 having a conventional digital camera 37 mounted thereon for recording visible light images. Alternatively, the visible light passing through hot mirror 92 could be directed to a viewport having an eyepiece mounted thereon. This arrangement allows the apparatus to be very quickly and easily switched between its use as an interferometer and a conventional microscope. This is quite advantageous for biological samples where both visual and interferometric data can be gathered without having to move the sample and without any significant time lapse between the visual inspection and interferometric data gathering.

When operating apparatus 20 in interferometric mode, a short coherence light source 52 is used. Shorter coherence length gives better depth discrimination when using coherence gating. The illustrated embodiments all employ a short coherence light source 52 with coherence gating. Coherence length is a function of the bandwidth of the light source. Coherence gating becomes difficult when the bandwidth exceeds 50 nm. Thus, short coherence light source 52 advantageously has a bandwidth no greater than 50 nm. Advantageously, a light source having a bandwidth within a range of 5 nm to 15 nm may be used. A bandwidth of less than 1 nm can be achieved with the use of a laser.

As mentioned above, the embodiment of FIGS. 4-7 include a sliding Fourier transform lens 66a and a fiber optic assembly that includes a signal emitting terminal end 59 mounted on an ancillary structure 50 of interferometry assembly 48a. This ancillary structure 50 can be easily pushed into, secured in, and pulled out of, the microscope body. The ancillary structure 50 of assembly 48a is approximately 7 inch (17.8 cm) by 10 inch (25.4 cm) by 3 inch (7.6 cm) metal block. Optically, the system is a fiber-to-free-space hybrid short-coherence interferometer like the embodiments of FIGS. 1A, 1B, 2A, 2B, 3A, 3B. The main components are the short-coherence light source (SLD) 52, path-matching motor 80 and translation stage 78, Fourier Transform lens 66a, angle matching mirrors 76, beam splitter 58 and imaging camera 62. The light coming out of the SLD light source is coupled in a 99:1 fiber coupler with 99% of the intensity going to the objective path illuminating the biological sample. The remaining 1% goes into the reference path using a delay stage to control the path length difference between the signal and the reference. The 99% arm of the coupler is collimated to a fiber collimator. The collimator guides the light to the sample. The Fourier Transform (FT) lens 66a is placed under the sample on the top of the ancillary structure, and the sample is precisely placed at the focal/Fourier Plane of the FT lens. The FT lens collects the back-scattered light at a 135 degree angle from the incident light from the collimator. A hot mirror 92 placed at a 45 degree beneath the FT lens guides the vertical back-scattered light to the horizontal direction inside the ancillary structure 48a. A second lens performs a de-magnification to the Fourier Plane to guide it through the 90/10 beam splitter (90% of the objective beam intensity transmitted) to the CCD chip on the camera. The 1% arm of the coupler is collimated to a different fiber collimator with a bigger light waist. The light then goes through the delay stage (the motor and the translation stage 78) passing the 90/10 beam splitter (10% of the reference beam intensity reflected) and interferes with the objective beam on the CCD chip using a critical angle. The critical angle is archived by adjusting two adjustable mirrors before it hits the 90/10 beam splitter.

The spatial filter 68 in combination with the Fourier filtering of lens 66a controls the speckle-size. It is advantageous if each speckle has three fringes and there are at least three pixels (on pixel-array detector 62) for each fringe. The critical or crossing angle between the reference beam and the signal beam as they intersect at the Fourier plane on pixel-array detector 62 determines the fringe spacing. In the illustrated embodiment, this crossing angle is 2 degrees although small variances from this angle may also produce acceptable result and depends, in part, on the other components of the system. It is further noted that by including one adjustable mirror 90 in the reference path and one adjustable mirror 90 in the signal path, the crossing angle of the reference beam and signal beam can be controlled. This allows the remaining mirrors 90 to be fixed relative to the ancillary structure. This use of only two adjustable mirrors provides enhanced mechanical stability.

When integrated into a conventional microscope body, the interferometry assembly including ancillary structure 48a will perform all of the functions necessary to acquire interferometric image data of the sample. The location of the ancillary structure 48a is fixed inside the microscope. Multiplexing scans will be performed by the inverted microscope body. The sample holder from the microscope will move to let the interferometry assembly illuminate different samples. The temperature control of the sample will also be performed by the temperature control unit from the microscope. The position of the interferometry assembly is arranged so that the microscope optics components and the interferometry assembly components share the same light path and the same focal plane. A lab technician can do the conventional imaging first, then without refocusing, the technician can obtain interferometric image data on the same sample by switching the microscope nose piece to make the Fourier transform lens collect back scattered light from the sample.

While the illustrated embodiments show the interferometry assembly integrated with a microscope, alternative embodiments may integrate such assemblies into a free-space platform. This would enable additional applications of the system and makes it easier to customize the system to meet different customer needs. The multiplexing scan can be performed in different ways. First, the location of the ancillary structure 50 could be fixed and the platform on which the sample is positioned is movable relative to the ancillary structure 50 to thereby provide the multiplexing scan functions. For example, stage 22 could be repositionable relative to the point at which the signal is emitted to thereby allow for adjustment of sampling depth, in other words, stage 22 could be vertically adjustable as indicated by arrows 23. This is a low-cost and easy-to-maintain solution. Another way is to fix the location of the sample holder. The ancillary structure 50 could then be mounted on a 2-axis motorized translation stage. When doing multiplexing, the ancillary structure 50 would move instead of the sample holder. This provides more stable samples to observe and would likely improve data quality.

The disclosed devices include several advantageous features that may employed separately or in various combinations depending upon the particular application. The disclosed interferometry assemblies 48, 48a provide interchangeable, miniaturized and modular assemblies. These assemblies are relatively small in size and this miniaturization reduces the manufacturing material cost and also reduces the mechanical instability caused by a big footprint. It is also very convenient to ship and re-install. Small assemblies also reduce the alignment time and lower the level of professional skill required of the operating technicians and the installation technicians.

The attachment of interferometry assembly 48, 48a to a conventional microscope will generally not require any optics change inside the microscope. This allows the microscope to retain its original functions. In some embodiments, conventional imaging and interferometric imaging can be done simultaneously while in the embodiment of FIGS. 4-7, switching between conventional imaging and interferometric imaging can be done within a matter of minutes simply by sliding the Fourier transform lens 66a. The use of hot mirror 92 also facilitates this rapid changing between imaging modes in the embodiment of FIGS. 4-7.

The Fourier transform lens 66a is disposed near the top of the ancillary structure 50 and sits on a precise rail so that the lens 66a can be slid away from the microscope optics path (this position is indicated by dashed lines in FIG. 8). The hot mirror 92 is mounted on a ring shaped holder under the FT lens 66a and inside the ancillary structure 50. The hot mirror 92 allows visible light 98 to pass through hot mirror 92 to a viewport in the lower microscope structure. With a special coating, the 45 degree angle hot mirror 92 reflects more than 97% of the vertical back scattered infrared light (840 nm) to a horizontal direction where it is subsequently directed to detector 62. More than 92% of the visible light with short wave length (usually used by conventional imaging) is transmitted through hot mirror 92 to the lower microscope optical path.

When acquiring interferometric image data, the FT lens will be slid into a position (indicated in solid lines in FIG. 8) where the FT lens 66a collects light backscattered by the sample. A precise sliding rail is used to minimize positional error. A locking mechanism advantageously holds the FT lens 66a securely in position to prevent mechanical vibration. In the illustrated embodiment, greater than 97% of 840 nm light is reflected by hot mirror 92 onto the signal path leading to detector 62. When doing conventional imaging, the FT lens will be slid back into the position indicated by dashed lines in FIG. 8 where it will not interact with light passing from the sample through hot mirror 92. In the illustrated example, greater than 92% of the visible signal light passes through hot mirror 92 to follow the conventional optical path to camera port 36.

The embodiments of FIGS. 1A, 1B, 2A, 2B, 3A, 3B have a high illumination angle wherein the angle between incident light and the collected scattered light is almost 180 degrees. Such a high angle provides high back scattering intensity. The disadvantage of the high angle approach is that it is too close to the reflection condition from flat optical surfaces in the optical path. Reflected light from surfaces of different interfaces can easily enter the optical path and reduce the quality of the results. To block these light returns, relatively long path lengths for the incident and collected back scattered light are generally required with high angle backscattering. This type of arrangement does not facilitate miniaturization and also generally requires an additional beamsplitter which causes a loss of light.

The embodiment of FIGS. 4-7 include embodies two distinctions from that of FIGS. 1A-3B to allow for a medium-angle back scattered configuration: 1) the embodiment of FIGS. 4-7 includes only one beam splitter instead of two thereby facilitating collection of more backscattered light. In the embodiments of FIGS. 1A-3B, there is a beamsplitter 86 guiding the objective light to the sample and collecting the back scattered light for the CCD camera in addition to the beamsplitter which splits light into signal and reference beams. Even with polarization control, beam splitter 86 may waste more than 60% of the intensity. The embodiment of FIGS. 4-7 has a medium angle back-scattering configuration that omits beam splitter 86. Instead, it uses a mirror to guide>95% of the intensity from the sample to the CCD camera. It can only be achieved in a medium-angle setup, because the incident and the back-scattered beam do not share common path. This alternative arrangement finds a balance between incident angle (back scattering intensity) and signal-to-noise ratio. The higher the angle the more back scattered intensity can be collected, but higher angle also means more reflected light with accompanying noise. A range of angles, 120 degrees to 150 degrees, provide a good balance of these factors and allows for the elimination of one of the beamsplitters. In the illustrated embodiment, a 135 degree angle was found to provide enough signal intensity and also good signal-to-noise ratio.

System stability is enhanced when all of the optical components are fixed in position. By securely mounting the components in a fixed position, mechanical vibrations can be limited. Fixing components in position, however, provides limited flexibility for system alignment and later maintenance. The illustrated embodiments employ only a minimal number of moveable components to obtain system stability while still providing convenient system alignment/maintenance and system stability. The objective path of the interferometry assembly 48, 48a is fixed and the focal plane is found using the microscope mechanism. This arrangement minimizes the need for anything to move in the optical path of interferometry assembly 48, 48a. To reach the critical angle between the reference path and the objective path as they intersect at detector 62, a pair of adjustable mirrors are provided to thereby allow for the adjustment of two degrees of freedom. In the embodiment of FIGS. 4-7, the two adjustable mirrors are both provided in the reference path, however, it would be possible to alternatively provide one adjustable mirror in both the reference path and the signal path or two adjustable mirrors in the signal path. The movable platform 78 and sliding Fourier transform lens 66a of the embodiment of FIGS. 5-8 are the only other moving components mounted in the ancillary structures 48, 48a.

The optical components mounted on ancillary structure 50 all have predefined spatial relationships with each other and the ancillary structure 50 even those which are subject to limited movement. This arrangement combined with the fixing of the majority of the optical components in ancillary structure 50 reduce the mechanical vibration while retain an ability to re-align the system.

Free-space optics add mechanical instability, reduce the signal intensity and can be used to change the polarization of the signal. The free-space setup is typically relatively easy to operate and replace. Fiber optics, on the other hand, generally provide better performance both optically and mechanically. The cost of fiber optics is also generally lower. But because of the nature of the back scattered light and limitations of fiber optics in Fourier optics, it can be desirable to create a hybrid optics structure. The fiber to free-space hybrid optics structure of the illustrated embodiments are designed to maximize the performance and minimize the cost and instability. A physical beam splitter is replaced by a fiber coupler 58 to get better intensity distribution between the objective and the reference path. Fiber collimators can be used to replace beam expanders and beam reducers in the signal and reference paths. The complex FT lens and back scattered light collection continue to use free space to maintain high-quality Fourier transforms and filtering. The delay stage (mirrors 76) also retains the free-space structure to provide a more stable wave front than those typically available with a fiber delay mechanism. The cost of a fiber delay mechanism is also relatively high. The beam combiner 70 is also free space instead of using fiber coupler because the critical angle can be more easily reached by adjusting free-space optics rather than fiber.

When retrofitting a pre-existing inverted microscope to form an apparatus as disclosed herein, the vibration reducing rubber feet on a conventional microscope may not provide the required stability. This can be overcome by providing additional vibration reduction features and/or by placing the apparatus on an anti-vibration table.

While this invention has been described as having an exemplary design, the present invention may be further modified within the spirit and scope of this disclosure. This application is therefore intended to cover any variations, uses, or adaptations of the invention using its general principles.

What is claimed is:

1. An apparatus for viewing a biological sample, the apparatus comprising:
   a stage on which the sample is positionable;
   a repositionable objective operably coupled with a first viewport, the objective being positionable whereby the sample can be viewed through the first viewport;
   a short-coherence light source, the apparatus, being configured to separate light generated by the short-coherence light source into a signal portion and a reference portion wherein the signal portion of the light from the light source is directed onto the sample;
   a Fourier transform lens and a detector in the form of a pixel-array detector positioned at a second viewport wherein the signal portion of the light scattered by the sample is at least partially collected to form a beam that is directed through the Fourier transform lens onto the detector;

an optic fiber assembly disposed to collect the reference portion of the light from the short-coherence light source and convey the reference portion of the light along a separate path from the signal portion of the light from a first position before the signal portion is directed onto the sample to a second position where the optic fiber assembly emits the reference portion of the light as a reference beam that is directed onto the detector wherein the light forming the reference beam reaches the detector without interacting with the sample or the Fourier transform lens, wherein the detector collects the reference beam and the signal beam to thereby acquire interferometric image data, and wherein the reference beam and the signal beam collected by the detector do not pass through the first viewport;

wherein the first viewport includes an eyepiece and the apparatus further comprises a near infra-red filter disposed between the objective and the eyepiece;

a diascopic illuminator disposed on the apparatus and operable such that the sample is diascopically viewable through the eyepiece of the first viewport simultaneously with acquisition of the interferometric image data; and an episcopic illuminator disposed on the apparatus and operable such that the sample is episcopically viewable through the eyepiece of the first viewport simultaneously with acquisition of the interferometric image data.

2. The apparatus of claim 1 wherein the optic fiber assembly includes a first fiber which collects light from the short-coherence light source, a first beam splitter coupled with the first fiber which splits the collected light into the signal portion and the reference portion at the first location, the signal portion being emitted and directed at the sample, the scattered light generated thereby forming the signal beam, a second fiber conveying the reference portion to the second position where the reference portion is emitted to form the reference beam.

3. The apparatus of claim 2 wherein the emitted reference beam is directed at a pair of mirrors fixed relative to each other and mounted on a moveable platform, selective movement of the platform varying the path length of the reference beam to thereby adjust a depth within the sample which will be coherence-gated by collection of the signal beam and the reference beam.

4. The apparatus of claim 3 further comprising a beam combiner wherein the beam combiner is disposed in the signal beam path after the Fourier transform lens and before the detector and wherein the beam combiner is disposed in the reference beam path after the pair of mirrors and before the detector and wherein the beam combiner directs both the signal beam and the reference beam at the detector.

5. The apparatus of claim 4 wherein the apparatus includes a microscope assembly having a microscope housing which supports the stage, the repositionable objective and the first viewport, the apparatus further comprising an interferometry assembly that includes an ancillary structure securable to the microscope housing, the ancillary structure defining the second viewport and supporting the Fourier transform lens, the moveable platform, the pair of mirrors, the beam combiner and the detector.

6. The apparatus of claim 4 further comprising a spatial filter disposed in the image plane of the signal beam path before the Fourier transform lens.

7. The apparatus of claim 6 wherein the emitted signal portion passes through a first polarizing filter, is then reflected by a second beam splitter, the signal portion is then scattered by the sample to form the signal beam, the signal beam passing back through the second beam splitter before being directed through the spatial filter.

8. The apparatus of claim 6 wherein the apparatus defines a signal path from the short-coherence light source to the detector and a reference path from the short-coherence light source to the detector and wherein each of the signal path and the reference path include at least one section defined by a fiber optic cable and at least one section defined by free-space communication and wherein the apparatus includes:

a microscope assembly having a microscope housing which supports the stage, the repositionable objective, and the first viewport;

an interferometry assembly that includes an ancillary structure securable to the microscope housing, the ancillary structure defining the second viewport and supporting the spatial filter, the Fourier transform lens, the moveable platform, the pair of mirrors, the beam combiner and the detector; and the reference path is defined by the first fiber and the second fiber from the short-coherence light source to the second position where the reference portion is emitted which is defined by the terminal end of the second fiber, the terminal end of the second fiber being secured to the ancillary structure and wherein the terminal end, the spatial filter, the Fourier transform lens, the pair of mirrors mounted on the moveable platform, the beam combiner and the detector are all mounted relative to the ancillary structure and have predefined spatial relationships with the ancillary structure and each other.

9. The apparatus of claim 2 wherein the apparatus defines a signal path from the short-coherence light source to the detector and a reference path from the short-coherence light source to the detector and wherein each of the signal path and the reference path include at least one section defined by a fiber optic cable and at least one section defined by free-space communication and wherein the apparatus includes:

a microscope assembly having a microscope housing which supports the stage, the repositionable objective, and the first viewport;

an interferometry assembly that includes an ancillary structure securable to the microscope housing, the ancillary structure defining the second viewport and supporting the Fourier transform lens and the detector; and the reference path is defined by the first fiber and the second fiber from the short-coherence light source to the second position where the reference portion is emitted which is defined by the terminal end of the second fiber, the terminal end of the second fiber being secured to the ancillary structure and wherein the terminal end, the Fourier transform lens, and the detector are all mounted relative to the ancillary structure and have predefined spatial relationships with the ancillary structure and each other.

10. The apparatus of claim 9 wherein the signal portion emitting terminal end of the optic fiber assembly is secured to the ancillary structure and emits the signal portion which is scattered by the sample to form the signal beam, the emitted signal portion defining an emitted light axis, the scattered light collected to form the signal beam defining a scattered light axis and being directed through the spatial filter, the emitted light axis and the scattered light axis defining an angle less than 180 degrees.

11. The apparatus of claim 10 wherein the angle is between 120 and 150 degrees.

12. The apparatus of claim 2 wherein a signal portion emitting terminal end of the fiber optic assembly emits the signal portion light which is scattered by the sample to form the signal beam, the emitted signal portion defining an emitted light axis, the scattered light collected to form the signal beam defining a scattered light axis and being directed toward an optical assembly including the Fourier transform lens, the emitted light axis and the scattered light axis defining an angle less than 180 degrees.

13. The apparatus of claim 12 wherein the angle is between 120 and 150 degrees.

14. The apparatus of claim 2 wherein the apparatus defines a signal path from the short-coherence light source to the detector and a reference path from the short-coherence light source to the detector and wherein each of the signal path and the reference path include at least one section defined by a fiber optic cable and at least one section defined by free-space communication.

15. An apparatus for viewing a biological sample, the apparatus comprising:
a stage on which the sample is positionable;
a repositionable objective operably coupled with a first viewport, the objective being positionable whereby the sample can be viewed through the first viewport;
a short-coherence light source, the apparatus being configured to separate light generated by the short-coherence light source into a signal portion and a reference portion wherein the signal portion of the light from the light source is directed onto the sample;
a Fourier transform lens and a detector in the form of a pixel-array detector positioned at a second viewport wherein the signal portion of the light scattered by the sample is at least partially collected to form a signal beam that is directed through the Fourier transform lens onto the detector;
an optic fiber assembly disposed to collect the reference portion of the light from the short-coherence light source and convey the reference portion of the light along a separate path from the signal portion of the light from a first position before the signal portion is directed onto the sample to a second position where the optic fiber assembly emits the reference portion of the light as a reference beam that is directed onto the detector wherein the light forming the reference beam reaches the detector without interacting with the sample or the Fourier transform lens, wherein the detector collects the reference beam and the signal beam to thereby acquire interferometric image data, and wherein the reference beam and the signal beam collected by the detector do not pass through the first viewport; and
wherein the Fourier transform lens is slidingly mounted and the apparatus further includes a hot mirror which allows visible light to pass therethrough and reflects infrared light, the hot mirror being positioned such that the infrared light reflected by the hot mirror is deflected to the detector and the visible light allowed to pass through the hot mirror is directed to the first viewport whereby the Fourier transform lens can be slid between a first position in which it intercepts the light striking the hot mirror and thereby intercepts the reflected infrared light before it is reflected to the detector and a second position where it does not intercept the light striking the hot mirror and thereby does not intercept the visible light allowed to pass through the hot mirror to the first viewport.

16. The apparatus of claim 15 further comprising a compensating transparent plate positioned between the hot mirror and viewport in the path of the visible light whereby the compensating transparent plate counteracts distortions caused by the hot mirror.

17. The apparatus of claim 1 wherein the signal portion is emitted and then scattered by the sample to form the signal beam, the emitted signal portion defining an emitted light axis, the scattered light collected to form the signal beam defining a scattered light axis and being directed toward an assembly including the Fourier transform lens, the emitted light axis and the scattered light axis defining an angle less than 180.

18. The apparatus of claim 17 wherein the depth within the sample at which the interferometric image data is acquired is determined by coherence gating.

19. The apparatus of claim 18 wherein the short-coherence light source defines a bandwidth no greater than 50 nm.

20. The apparatus of claim 19 wherein the angle is between 120 and 150 degrees.

21. The apparatus of claim 1 wherein the detector is one of a CCD camera chip, a scientific CMOS chip, and a pixel-array of infrared detectors.

22. The apparatus of claim 1 wherein the short-coherence light source defines a bandwidth no greater than 50 nm.

23. The apparatus of claim 15 wherein the apparatus comprises a diascopic optical train by which light passing through the sample is directed through the objective and to the first viewport and wherein the sample can be viewed through the diascopic optical train simultaneously with collection of the signal beam and the reference beam by the detector.

24. The apparatus of claim 23 wherein the diascopic optical train includes a diascopic illuminator and wherein the apparatus further includes an episcopic illuminator wherein the sample can be viewed episcopically through the first viewport simultaneously with the collection of the signal beam and the reference beam by the detector.

25. The apparatus of claim 1 wherein the first viewport further includes a camera port.

26. The apparatus of claim 15 further comprising an illumination system positioned to illuminate the sample when viewing the sample through the first viewport.

27. The apparatus of claim 26 wherein the illumination system is an episcopic illumination system that directs reflected light through the objective and to the first viewport.

28. The apparatus of claim 1 wherein the Fourier transform lens is slidingly mounted and the apparatus further includes a hot mirror which allows visible light to pass therethrough and reflects infrared light, the hot mirror being positioned such that the infrared light reflected by the hot mirror is deflected to the detector and the visible light allowed to pass through the hot mirror is directed to the first viewport whereby the Fourier transform lens can be slid between a first position in which it intercepts the light striking the hot mirror and thereby intercepts the reflected infrared light before it is reflected to the detector and a second position where it does not intercept the light striking the hot mirror and thereby does not intercept the visible light allowed to pass through the hot mirror to the first viewport.

29. The apparatus of claim 1 further comprising a rotatable turret, the objective being disposed on the rotatable turret.

30. The apparatus of claim 1 wherein the stage includes a plurality of wells for holding a plurality of samples, the plurality of wells being repositionable whereby a selected one of the wells is positionable for viewing through the first viewport and for collection of data by the detector.

31. The apparatus of claim 1 wherein the interferometric image data is acquired at a resolution that allows features of less than 15 microns to be resolved and wherein each speckle has three fringes and there are at least three pixels for each fringe.

32. A method of using an apparatus for viewing a biological sample, comprising:
   positioning the sample on a stage;
   positioning an objective to thereby view the sample through a first viewport of the apparatus wherein the first viewport includes an eyepiece and a near infra-red filter is disposed between the objective and the eyepiece;
   generating light from a short-coherence light source;
   separating light generated by the short-coherence light source into a signal portion and a reference portion;
   directing the signal portion of the light onto the sample;
   forming a signal beam with at least part of the signal portion of the light scattered by the sample and directing the signal beam through a Fourier transform lens onto a pixel array detector positioned at a second viewport;
   using an optic fiber assembly to convey the reference portion of the light from the short-coherence light source and emit a reference beam directed onto the detector;
   collecting the reference beam and the signal beam with the detector and thereby acquiring interferometric image data and wherein the signal portion and signal beam define a signal path and the reference portion and the reference beam define a reference path, the signal path and reference path defining separate paths from a position where the light is separated into a signal portion and a reference portion to a position on the signal path after forming the signal beam and a position on the reference path after the optic fiber assembly has emitted the reference beam wherein the reference path does not interact with the sample or the Fourier transform lens and the reference beam and the signal beam collected by the detector do not pass through the first viewport;
   providing a diascopic illuminator wherein the sample is viewable diascopically through the first viewport simultaneously with the collection of the reference beam and the signal beam with the detector; and
   providing an episcopic illuminator wherein the sample is viewable episcopically through the first viewport simultaneously with the collection of the reference beam and the signal beam with the detector.

33. The method of claim 32 wherein the signal portion of the light directed onto the sample defines an emitted light axis and the light scattered by the sample and collected to form the the signal beam defines a scattered light axis and wherein the angle between the emitted light axis and the scattered light axis is between 120 and 150 degrees.

34. The method of claim 33 wherein coherence gating is used to control the depth within the sample at which the interferometric image data is acquired.

35. The method of claim 34 wherein the short-coherence light source defines a bandwidth no greater than 50 nm.

36. The method of claim 32 wherein the interferometric image data is acquired at a resolution that allows features of less than 15 microns to be resolved and wherein each speckle has three fringes and there are at least three pixels for each fringe.

37. The method of claim 36 further comprising positioning the apparatus on an antivibration table.

\* \* \* \* \*

UNITED STATES PATENT AND TRADEMARK OFFICE
CERTIFICATE OF CORRECTION

PATENT NO. : 10,642,014 B2
APPLICATION NO. : 15/068275
DATED : May 5, 2020
INVENTOR(S) : David D. Nolte, John J. Turek and Ran An Page 1 of 1

It is certified that error appears in the above-identified patent and that said Letters Patent is hereby corrected as shown below:

In the Claims

Column 19, Line 2, Claim 1, the phrase "to form a beam" should read --to form a signal beam--.

Column 24, Lines 22-23, Claim 33, the phrase "to form the the signal beam" should read --to form the signal beam--.

Signed and Sealed this
Thirtieth Day of June, 2020

Andrei Iancu
*Director of the United States Patent and Trademark Office*